US007103324B2

(12) United States Patent
Sanford et al.

(10) Patent No.: US 7,103,324 B2
(45) Date of Patent: Sep. 5, 2006

(54) WIRELESS DATA TRANSMISSION IN BETWEEN SEAT ROWS IN AIRCRAFT

(75) Inventors: William C. Sanford, Mukilteo, WA (US); Daniel J. Diessner, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 376 days.

(21) Appl. No.: 10/272,658

(22) Filed: Oct. 16, 2002

(65) Prior Publication Data
US 2004/0077308 A1    Apr. 22, 2004

(51) Int. Cl.
*H04B 1/34*    (2006.01)
(52) U.S. Cl. .......................................... 455/98; 455/92
(58) Field of Classification Search ................. 455/99, 455/98, 91, 431, 569.1, 569.2, 92; 725/110, 725/73; 341/22, 99, 98, 91
See application file for complete search history.

(56) References Cited

U.S. PATENT DOCUMENTS 6,703,963 B1 *    3/2004   Higginson ................... 341/176
2003/0083024 A1 *  5/2003   Richenstein et al. .......... 455/99

* cited by examiner

*Primary Examiner*—Edward F. Urban
*Assistant Examiner*—Tu X. Nguyen
(74) *Attorney, Agent, or Firm*—Lee & Hayes, PLLC

(57) ABSTRACT

An apparatus for communication with a wireless network is provided. A video display unit is mounted on a seat back. The video display unit includes a processor, a video display electrically coupled to the processor, a component configured for wireless communication with the processor, and a receiver electrically coupled to the processor. A user interface is mounted on an armrest. The user interface includes a user input interface and a transmitter electrically coupled to the user input interface.

20 Claims, 3 Drawing Sheets

WIRELESS DATA TRANSMISSION IN BETWEEN SEAT ROWS IN AIRCRAFT

RELATED APPLICATION

This application is related to an application on file with the United States Patent and Trademark Office Ser. No. 10/021,693, dated Dec. 12, 2001; this related application is incorporated in its entirety by this reference.

FIELD OF THE INVENTION

This invention relates generally to networks and, more specifically, to wireless networks.

BACKGROUND OF THE INVENTION

Airline passengers have come to expect the delivery of data and in-flight digital entertainment content to them in their seats. The common means of delivery is through video display units ("VDUs") embedded in a back of a seat in a row immediately ahead of the passenger. In one simple embodiment, in-flight movies are delivered to the VDUs from a central video transmitter. Data signals including audio or video programming are distributed to each of the seats by hard wires, such as coaxial cable, and are routed to the each of the VDUs.

For the sake of safety and convenience, cables supplying these signals are run in the overhead or under the floor, and supply signal to the seats via columns of wiring that emerge from the flooring for center row seating, and from the sidewalls for the lateral seating. Signals service a column of seats, with a daisy chain of wires going from seat row to seat row. The wires between these seat rows are carried in a raceway adjacent to the seat track, and are protected and covered by a seat track cover, usually a rubber type material. The coaxial cable arrives at its destination seat back, by passing the cable through the seat structure and allows the routing of the coaxial cable to the VDU in the seat back.

To allow the passenger to control the VDU, a passenger control unit ("PCU") is typically embedded in the armrest of the passenger seat. To enable the PCU, wire connections are routed from the passenger seat to the seat tray along the wire race to the preceding row of seats, and up to the VDU in the seat back immediately in front of the passenger seat. Each additional passenger seat generally entails similar connections.

Passenger demand has caused a need for even greater network service offerings. Rather than a single movie, passengers may desire a choice of several movies. Additionally, passengers may wish to have access to the Internet from their seat station. This increased data content is carried over the wired Ethernet-type conductor to the passenger interface. Wiring within the seat track raceway is either sized in length to fit the pitch of the seats, or there is a service loop of cable that allows limited flexibility in the positioning of the seats.

In many commercial settings, wireless networks have replaced the standard "hard wired" Ethernet network. To that end, the Institute of Electrical and Electronic Engineers, the "IEEE", has promulgated the standard 802.11 for wireless networking. This standard has been widely accepted. Manufacturers offer many 802.11-compliant products for wireless networking. Wireless networks offer the advantage of accommodating moderately-sized (256 users) per radio frequency channel. Therefore, where larger networks are required, more channels are used.

The recognized economies of wireless networks have made them an attractive vehicle for distribution of data in environments where individual wires are cumbersome. As demonstrated in the discussion above, an airplane cabin is such an environment. Therefore, there is an unmet need in the art for applying wireless network technology to providing the connection of numerous VDUs to a central server in an airline passenger cabin.

SUMMARY OF THE INVENTION

The invention provides an apparatus for communication with a wireless network. According to one embodiment of the invention, an apparatus includes a video display unit ("VDU") mounted on a seat back. The VDU includes a processor, a video display electrically coupled to the processor, a component configured for wireless communication with the processor, and a receiver electrically bidirectionally coupled to the processor. The apparatus also includes a user interface mounted on an armrest. The user interface includes a user input interface and a transmitter electrically coupled to the user input interface.

The exploitation of wireless networking for providing information at the VDU allows diversity of programming without an extensive network of wires in the raceway along the tracks in the deck of the aircraft passenger cabin. According to one embodiment of the invention, adapting wireless networks according to the IEEE standard for 802.11, the wireless networks will carry signals to each seat as a distinct recipient. Freed from the network of wires, seats may be placed and re-placed within the passenger cabin in a manner to most efficiently seat the mix of passengers available for a particular flight. Not having to rewire the seats makes their removal, configuration, and replacement a much quicker and less expensive process. For instance, by providing the ability to address individual seats, passengers could "pay-per-view" ordered movies and audio tracks. Individual addressability allows for interactive programming to an extent not possible with standard "channeled" wiring.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, the invention provides an apparatus for communication with a wireless network. The apparatus includes a video display unit ("VDU") mounted on a seat back. The VDU includes a processor, a video display electrically coupled to the processor, a component configured for wireless communication with the processor, and a receiver electrically coupled to the processor. The apparatus also includes a user interface mounted on an armrest. The user interface includes a user input interface and a transmitter electrically coupled to the user input interface.

Figure 1:
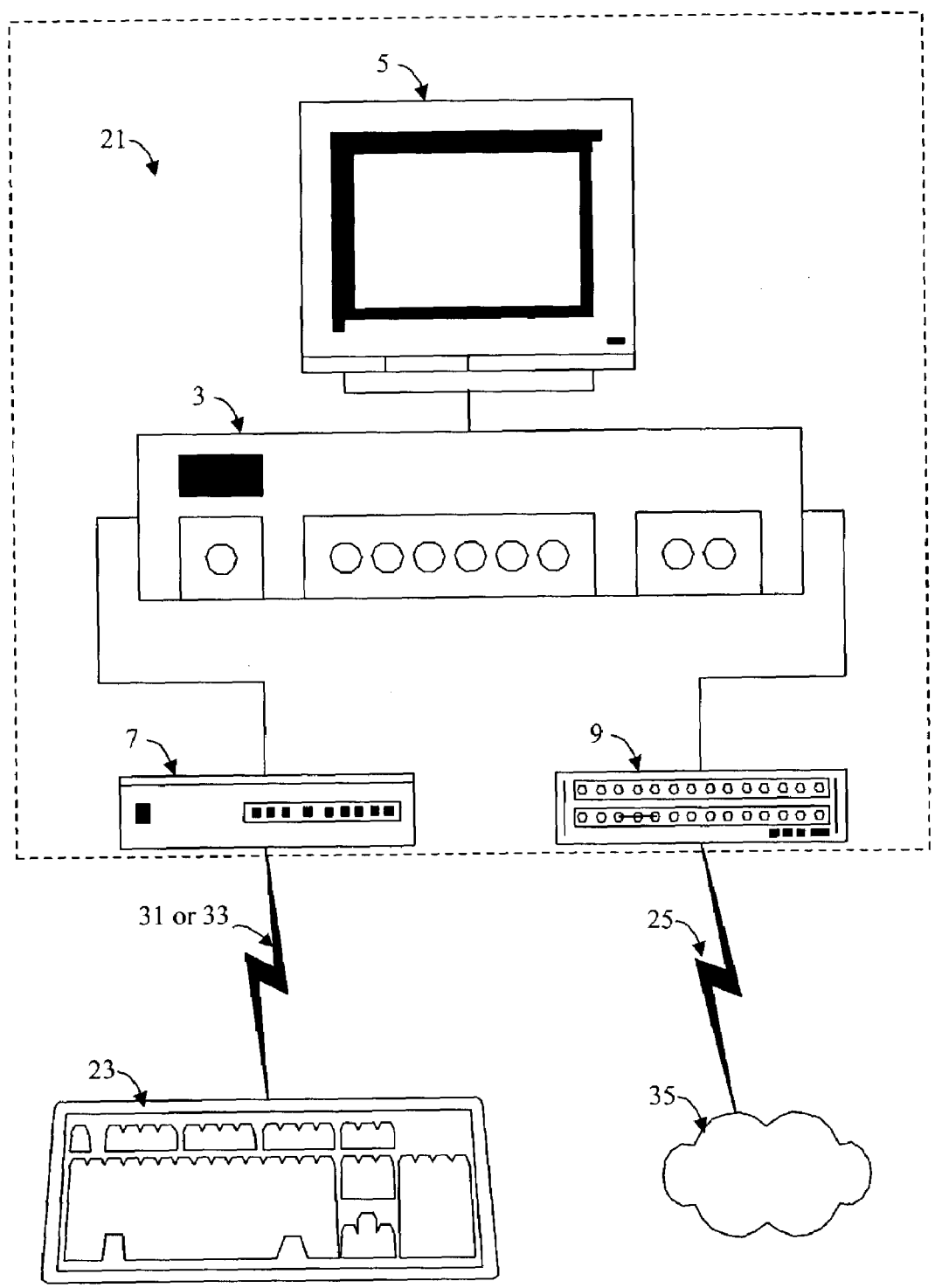
FIG. 1 is a schematic view of an apparatus for communication with a wireless network in accordance with an embodiment of the invention.

Referring to FIG. 1, the VDU 23, is shown in one embodiment. A component configured for wireless communication, a transceiver 9, receives a signal over a link 25 from a wireless network 35 and plays it back much as a television plays a television signal back. Also shown in FIG. 1, is the passenger control unit ("PCU") 23. The PCU 23 is linked to a processor 3 by means of either a collimated light signal 31 or a short-range radio frequency signal 33. The PCU 23 is used in an analogous role to control volume or to select from a number of distinct programming selections. In a presently preferred embodiment, the link to the wireless network 25 carries extensive content, including in one embodiment, a link to the Internet allowing the VDU 21 to display Internet pages, a data port (not shown) for a passenger to use with his or her own laptop computer or PDA, a selection of any number of movies served to the passenger on a "pay-per-view" basis, or any other of a number of configurations of program content. The VDU 21 includes a link to wireless network 25, a receiver to receive signals from the PCU 23, a central processor 3 in communication with both the transceiver 9 connected to the wireless link 25, and the PCU 23, and a video display screen 5.

The portal through which all of the information passes to the VDU 21 is the wireless network link 25. A presently preferred embodiment of the invention suitably employs IEEE 802.11a wireless LAN standard compliant transponders mounted on the seat units 10 to facilitate the wireless link 25. IEEE 802.11a wireless LAN standard is a 5-gigahertz radio frequency signal that is used for wirelessly dispersing audio and visual content to visual display units 21 in the seat units 10. According to the 802.11a standard, data is transmitted at 54 megabits per second. At such speeds, for instance, the video content stored on a DVD without compression can be transmitted to a seat back unit without any information dropout. IEEE 802.11a allows 8 distinct channels allowing for the heavy use necessary in a passenger cabin full to its capacity. While any wireless protocol will work, any of the 802.11 standard protocols will work, and the 802.11a is the presently preferred embodiment.

Figure 2:
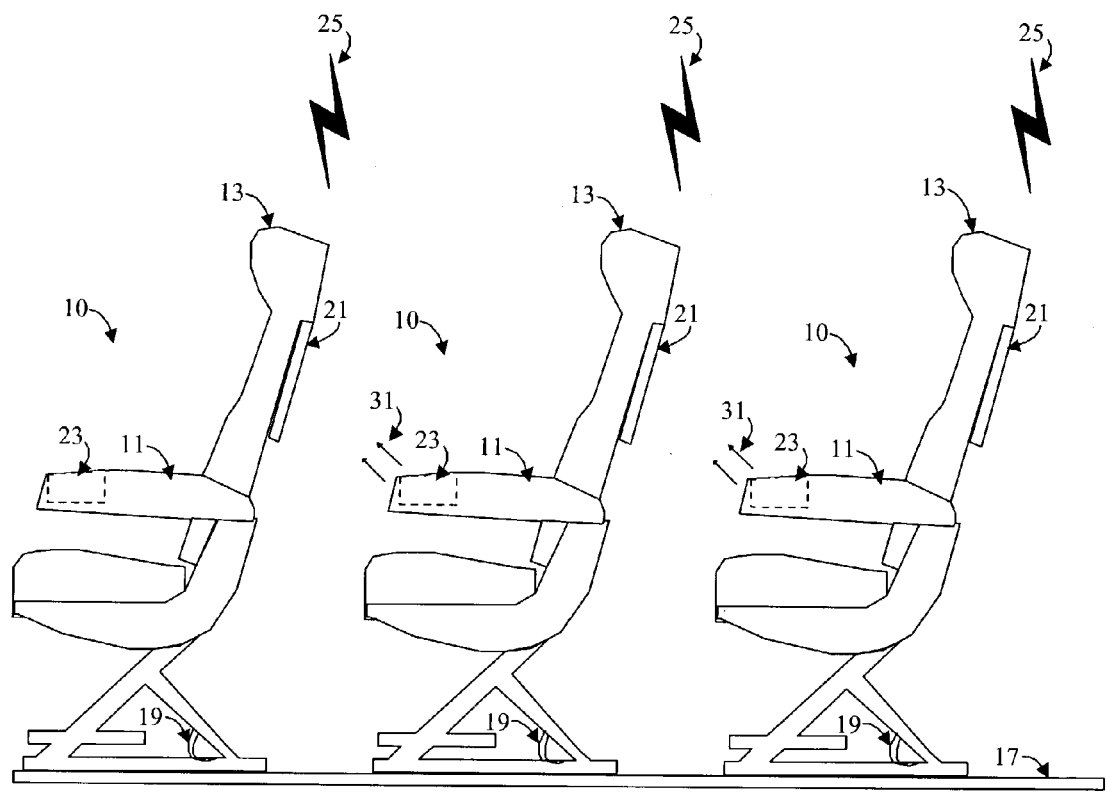
FIG. 2 is a side view of three of the inventive units with light radiation connection.

Referring additionally to FIG. 2, three seat units 10 are portrayed. Each seat unit has an armrest 11 and a seat back 13. The seat unit is powered by power (three wires, including ground) wires 19 that complete a circuit with power busses laid in the wire races in the decking 17 of a vehicle such as an airplane. No other connections are necessary. A VDU 21 is embedded in the seat back 13 and a PCU 23 embedded in the armrest 11.

A passenger sits in the seat unit 10 while viewing the VDU 21. To enter their preferences, the passenger will operate the PCU 23 embedded in the armrest 11. A collimated light signal 31 is sent from the PCU 23 to the VDU 21. In one presently preferred embodiment, the collimated light signal 31 is an infrared signal such as is used between a consumer electronic remote control and a device it controls. The seat units 10 are fixed to the decking 17. For this reason, the infrared signal 31 can be optically aimed at the visual display unit 21 with sufficient precision minimize or avoid bleed-over. For example, bleed over may occur where one PCU 23 might emit a collimated light signal 31 and activate not only the VDU 21 on the seat back 13 immediately in front of the seat unit 10, but any other VDU 21 in front of the seat unit 10.

There is no need to limit the information to that passing from the PCU 23 to the VDU 21. Where the PCU 23 is so configured, it may serve as the outlet for audio signals. Traditionally, PCUs 23 will have an outlet jack for either electrical signals to headphones or tubes serving as audio channels from transducers embedded in the PCUs 23. Thus, two channels of collimated light or a two-way wireless link enables both the receiver and the transmitter to serve as transceivers accommodating a two-way signal exchange.

Nor is it necessary that the VDU 21 itself be the reception site for the collimated light signal 31 on the seat back 13. For instance, where a receiver is mounted on the forward facing aspect of the armrest 11, movement of seat back 13 to allow an occupying passenger to recline would not move the receiver relative to the PCU 23 on the seat unit 10 immediately behind the reclining passenger area.

Because the seat units 10 tend to bear a fixed relationship one to another by virtue of their fixation on the deck 17, any light signal can be used. Infrared signals are favored by the consumer electronics industry because it is light of a frequency not normally found in the ambient environment. By allowing the aiming of an optical signal, light in the visible spectrum which is normally present in the ambient environment can be used in a narrowly focused beam to transfer signal information. Laser lights, although more expensive, will also work.

Properly configured, any wavelength of light may be used because of the narrow focus. As the beams are narrowly directed, there is little danger of inadvertently triggering an unintended display unit is unlikely. Selection of frequencies consistent with the color scheme selected for the cabin interior will assure that the cabin appointments will absorb any stray light in the control frequency. Once the link between the PCU 23 and the VDU 21 is established, the system affords interactivity between the VDU 21 and the passenger.

Figure 3:
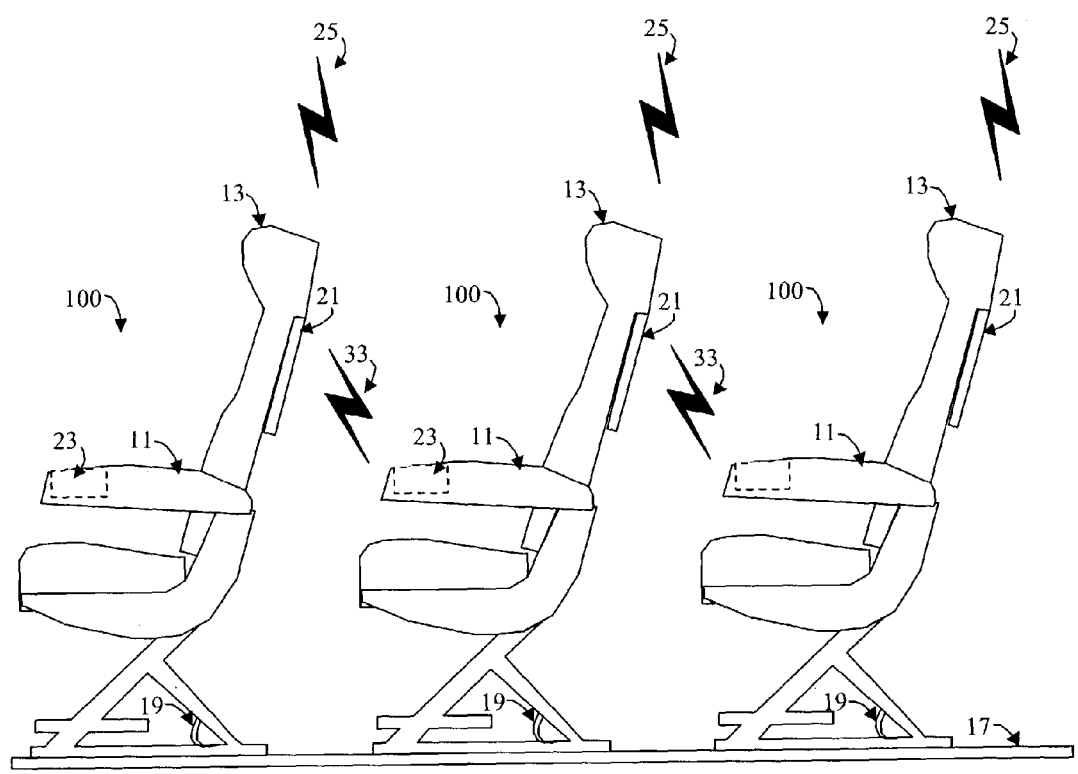
FIG. 3 is a side view of three units with a RF link connection.

FIG. 3 shows seat units 100 that share many of the same features in common with the seat units 10 of FIG. 2. The seat units 100 include an armrest 11 and a seat back 13 and are energized by a power pickup 19. A VDU 21 is mounted on each seat back 13 while a PCU 23 is embedded in each armrest 11. Also shown is the wireless network link 25 discussed above. The distinction between the seat units 10 of FIG. 2 and the seat units 100 of FIG. 3 is the presence of a short-range wireless connection 33 in the place of the collimated light signal 31 (FIG. 2). Unlike the collimated light signal 31 (FIG. 2), the short-range wireless connection 33 bridges the gap between the PCU 23 and the VDU 21 with a short-range radio signal.

The short-range wireless connection 33 facilitates communication between the PCU 23 and the VDU 21 but does not rely upon the spatial relationship between one seat 10 and the seat immediately in front of it. This is especially useful where a non-standard distance between the seats 10 is necessary such as in an exit aisle. Unlike a collimated light signal 31 (FIG. 2), short-range wireless connection 33 is not directional nor is it readily focused to emulate the directional nature of focused light. By short-range, what is meant is a signal not intended to travel more than the distance covered by two or more seat rows. In short-range wireless applications entail some distinct act to achieve synchronization between PCU 23 and the VDU 21 in the seat back immediately in front of it. With a collimated light signal 31 (FIG. 1), simply pointing the beam at the receiver on the seat back 13 achieves the synchronization.

To achieve synchronization between transmitter and receiver in an environment crowded with potential receivers and transmitters, one method is to simultaneously activate switches on a receiver/transmitter pair. The transmitter "squawks," i.e. transmits a unique code identifying the transmitter, the receiver receives the "squawk" and limit its reception to transmissions preceded by the squawked code.

Because of this synchronization as well as the extremely low power levels of the transmitted signals, many seat units 100 can share the same frequency for transmission without interfering with the operation one of another.

Regardless of the method of transmission, either collimated light signal 31 or short-range wireless links 33, once synchronization has occurred and the seats have transmitted the addresses of the synchronized pairs, a processor (not shown) can develop a seating map of the passenger cabin that can be used in troubleshooting. Where seat units include a row of three individual seats, each with their own VDU 21, the placement of the VDUs 21 along the row is known to the computer and the relationship of one PCU to one VDU is fixed. Because the seat backs form a unit, the spatial relationship of one VDU 21 to another in the same row is fixed. Simple Boolean logic will work to sort the rows backward from a first row. Thus, upon installation of all seat rows and synchronization of one PCU 23 for each VDU 21, a map is generated for the resulting section. If one or more VDUs are not functioning, they can be rapidly located in the resulting map. Similarly, any mistakes in synchronization will rapidly be revealed and pinpointed.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus for communication with a wireless network, the apparatus comprising:
   a video display unit mounted on a seat back of a first seat, the video display unit including:
      a processor configured to process control signals controlling the video display unit;
      a video display electrically coupled to the processor;
      a component configured for wireless communication with the processor; and
      a receiver electrically coupled to the processor; and
   a user interface, mounted on an armrest of a second seat, in wireless communication with the processor, the user interface including:
      a user input interface; and
      a transmitter electrically coupled to the user input interface and configured to transmit control signals corresponding to inputs received at the user input interface, the control signals including a reconfigurable synchronization identifier, at least one of the user interface and the video display unit being adapted to selectively synchronize to the synchronization identifier upon the communication of an interface synchronization instruction causing the synchronization identifier to be stored such that the video display unit will execute only control signal including the stored synchronization identifier.

2. The apparatus of claim 1, wherein the transmitter and the receiver are configured to at least one of receive and to transmit wireless signals.

3. The apparatus of claim 2, wherein the wireless signals include at least one of:
   infrared wireless signals;
   optical wireless signals; and
   radio frequency wireless signals.

4. The apparatus of claim 1, wherein the component for wireless communication includes a wireless access point.

5. The apparatus of claim 4, wherein the wireless access point complies with a standard promulgated by the IEEE 802 LAN/MAN Standards Committee.

6. The apparatus of claim 1, wherein the user interface includes a keypad.

7. The apparatus of claim 1, wherein the user interface includes a graphic user interface.

8. The apparatus of claim 1, wherein the transmitter of the user interface emits a collimated beam directed at the receiver of the video display unit mounted on one of the plurality of seats immediately in front of the wireless transmitter.

9. The apparatus of claim 1, wherein at least one of:
   the video display unit communicates the interface synchronization instruction to the user interface causing the synchronization identifier to be stored by the user interface; and
   the user interface communicates the interface synchronization instruction to the video display unit causing the synchronization identifier to be stored by the video display.

10. The apparatus of claim 1, wherein the synchronization identifier is stored until a next interface synchronization instruction is wirelessly communicated between the video display unit and the user interface.

11. A seating system for communication with a wireless network, the system comprising:
    a plurality of first seats, each first seat having a seat back;
    a plurality of video display units mounted on the seat backs of the plurality of first seats, each video display unit including:
       a video display unit mounted on a seat back of a first seat, the video display unit including:
          a processor configured to process control signals changing operation of the video display unit;
          a video display electrically coupled to the processor;
          a component configured for wireless communication with the processor;
          a receiver electrically coupled to the processor; and
          a switch electrically, coupled to the processor and selectively closed to cause the receiver to receive and store a synchronization code transmitted to the receiver, the processor configured to respond to control signals having the synchronization code received while the switch is closed; and
    a plurality of second seats arrayed in a plurality of second rows adjacent to the first rows, each second seat having an armrest comprising:
       a plurality of user interfaces, mounted on armrests of the plurality of second seats, the user interface adapted to synchronize with the video display unit, each user interface including:
          a user input interface; and
          a transmitter electrically coupled to the user input interface and configured to communicate with the receiver such that activation of the user interface will transmit control signals to the processor and a synchronization code associated with the user interface to one of the processor of the video display units of the plurality of first seats, the transmitter comprising a switch selectively closed to cause the transmitter to transmit the synchronization code to one of the processors of the video display unit of the plurality of first seats to synchronize the user interface and one of the video display units.

12. The apparatus of claim 11, wherein the transmitter and the receiver are configured to at least one of receive and to transmit wireless signals.

13. The apparatus of claim 12, wherein the wireless signals include at least one of:
    infrared wireless signals;
    optical wireless signals; and
    radio frequency wireless signals.

14. The apparatus of claim 11, wherein the component for wireless communication includes a wireless access point.

15. The apparatus of claim 14, wherein the wireless access point complies with a standard promulgated by the IEEE 802 LAN/MAN Standards Committee.

16. The apparatus of claim 11, wherein the user interface includes a keypad.

17. The apparatus of claim 11, wherein the user interface includes a graphic user interface.

18. A method for displaying information to a passenger in a seat, the method comprising:
    providing a plurality of seats disposed in a plurality of rows and columns, the seats having seat backs and arm rests;
    providing a central transmitting station comprising a memory for storing media content, a central transmitter/receiver generating long-range wireless signals receivable at substantially all of the seats, and a processor for controlling the central transmitter/receiver;
    providing a plurality of video display units (VDU) disposed in a plurality of seat backs of the plurality of seats, the VDUs comprising:
        a VDU media wireless receiver configured to receive the long-range wireless signals from the central transmitter/receiver;
        a VDU control receiver configured to receive control signals;
        a processor coupled to the VDU media wireless receiver and VDU control receiver for processing information received thereby;
        an output unit generating at least one of video and audio based on the long-range wireless signals the output unit operably connected to processor, the processor controlling the output unit according to the control signals received at the VDU control receiver;
        a VDU synchronization switch coupled to the processor, the processor configured to receive and store a synchronization code received by the VDU control receiver when the VDU synchronization switch is activated;
        a memory operably connected to the processor for storing the synchronization code;
    providing a plurality of personal control units (PCUs) disposed in a plurality of the arm rests of the plurality of seats, the PCUs comprising:
        an interface receiving user inputs;
        a short-range transmitter having a range substantially less than an area occupied by the seats, the transmitter transmitting control signals; and
        a processor operably connected to the interface and the short/range transmitter, the processor configured to cause the short-range transmitter to generate control signals in response to the user inputs; and
        a PCU synchronization switch coupled to the processor; the processor programmed to cause the transmitter to transmit a synchronization code associated with the PCU upon activation of the PCU synchronization switch;
    sequentially activating the VDU synchronization switch of the VDUs of the plurality of seats while activating the PCU synchronization switch of another of the plurality of seats located therebehind;
    transmitting the synchronization code of the PCUs from the short-range transmitter thereof to one of the VDU control receiver located in front thereof;
    storing the synchronization codes in the memory of the VDU;
    transmitting control signals from at least one of the PCUs, each control signal including the synchronization code of the at least one PCU generating the control signal; and
    executing the control signals on the processor of the VDU storing the synchronization code included in the control signal.

19. The method of claim 18, wherein the VDUs have a VDU identifier associated therewith, the method further comprising transmitting the synchronization codes and VDU identifiers from the VDUs to the central transmitting station and generating a map of VDU identifiers and synchronization codes stored by the VDU associated with each of the VDU identifiers.

20. The apparatus of claim 18, wherein the short-range transmitters of the PCUs emit a collimated beam directed at the VDU control receiver mounted on one of the plurality of seats immediately in front of the short-range transmitters.

* * * * *